United States Patent
Katou et al.

(10) Patent No.: US 8,569,622 B2
(45) Date of Patent: Oct. 29, 2013

(54) WIRE HARNESS

(75) Inventors: Takashi Katou, Makinohara (JP); Tatsuya Oga, Kosai (JP)

(73) Assignee: Yazaki Corporation, Tokyo (JP)

( * ) Notice: Subject to any disclaimer, the term of this patent is extended or adjusted under 35 U.S.C. 154(b) by 15 days.

(21) Appl. No.: 13/150,805

(22) Filed: Jun. 1, 2011

(65) Prior Publication Data
US 2011/0297415 A1 Dec. 8, 2011

(30) Foreign Application Priority Data
Jun. 2, 2010 (JP) ................................ P2010-126528

(51) Int. Cl.
*H02G 3/04* (2006.01)

(52) U.S. Cl.
USPC ...... 174/68.3; 174/68.1; 174/72 A; 174/71 R; 138/121; 138/173

(58) Field of Classification Search
USPC ...... 174/68.1, 68.3, 72 A, 71 R, 70 R, 106 D; 138/121, 173, 118, 172
See application file for complete search history.

(56) References Cited

U.S. PATENT DOCUMENTS

| | | | | |
|---|---|---|---|---|
| 3,717,718 A | * | 2/1973 | Schmidtchen | 174/106 D |
| 3,837,364 A | * | 9/1974 | Jenner | 464/175 |
| 3,903,928 A | * | 9/1975 | Sykes et al. | 138/109 |
| 4,705,914 A | * | 11/1987 | Bondon | 174/28 |
| 5,463,187 A | * | 10/1995 | Battle | 174/88 R |
| 6,515,229 B2 | * | 2/2003 | Aoki et al. | 174/72 A |
| 6,848,478 B2 | * | 2/2005 | Nagai | 138/112 |
| 6,875,918 B2 | * | 4/2005 | Sudo et al. | 174/363 |
| 7,563,981 B2 | * | 7/2009 | Ichikawa et al. | 174/72 A |
| 8,237,054 B2 | * | 8/2012 | Wiekhorst et al. | 174/110 R |
| 2011/0127084 A1 | * | 6/2011 | Ichikawa et al. | 174/72 A |
| 2011/0132638 A1 | * | 6/2011 | Oga et al. | 174/135 |

FOREIGN PATENT DOCUMENTS

| | | | | |
|---|---|---|---|---|
| JP | 2000-197237 A | | 7/2000 | |
| JP | 2000197237 A | * | 7/2000 | |

* cited by examiner

*Primary Examiner* — Jinhee Lee
*Assistant Examiner* — Dimary Lopez
(74) *Attorney, Agent, or Firm* — Sughrue Mion, PLLC (57) ABSTRACT

In a double-layered construction corrugated tube 23 of a wire harness 21 which are provided on an outer side of a high voltage cable 22, an outer corrugated tube 26 is formed without a slit. In addition, an inner corrugated tube 27 is formed so as to be inserted from one end to the other end of the outer corrugated tube 26 with the high voltage cable 22 accommodated therein. The inner corrugated tube 27 is formed so that a pitch P1 between adjacent ridge portions 38 thereof is narrower than a pitch P2 between adjacent groove portions 30 of the outer corrugated tube 26.

5 Claims, 6 Drawing Sheets

WIRE HARNESS

BACKGROUND OF THE INVENTION

1. Field of the Invention

The present invention relates to a wire harness including an electric cable and a double-layered corrugated tube.

2. Description of the Related Art

Wire harnesses are laid in a vehicle such as a motor vehicle for effecting electrical connections. Wire harnesses are widely known in which thin electric wires are bound together. In addition, in recent years, wire harnesses are also known which include thick high voltage cables for electric vehicles or hybrid vehicles. There are also known wire harnesses which include an electric wire or cable protection corrugated tube in addition to those conventional constituent members. Patent Document 1 below discloses a wire harness which employs a technique in which a bundle of electric wires is protected by a corrugated tube and thereafter, a predetermined portion of the corrugated tube is protected further by another corrugated tube. Namely, the wire harness is disclosed therein which employs the technique in which the double-layered corrugated tube construction is partially adopted.

A slit is formed in the corrugated tube of Patent Document 1 below for allowing the insertion of the bundle of electric wires into the corrugated tube. Because of this, in the event that there is provided only one corrugated tube, there exists a possibility that an external interference material enters an interior of the corrugated tube. Should the external interference material enter the interior of the corrugated tube, the electric wires are damaged by the external interference material. The wire harness disclosed in Patent Document 1 below is intended not only to prevent the entrance of the external interference material but also to prevent the damage of the electric wires and proposes the double-layered construction in which the slit in the corrugated tube is covered to be concealed by the additional corrugated tube.

The additional corrugated tube, that is, the outer corrugated tube is disposed so that its own slit is not registered with the slit position of the inner corrugated tube. The outer corrugated tube is fixed with a tape which is wound therearound.

Patent Document 1: JP-A-2000-197237

In the related art described above, the bundle of electric wires is inserted into the inner corrugated tube through the slit formed therein, and thereafter, the outer corrugated tube is assembled on to the predetermined portion of the inner corrugated tube. Specifically, at first, the slit in the outer corrugated tube is opened, and then, the inner corrugated tube is inserted into the outer corrugated tube through the slit so opened. Finally, the tape is wound round the outer corrugated tube so as to fix it in place.

As is seen from the description of the work involved, in the related art wire harness, the work becomes complex, resulting in a problem that the workability is not good. In addition, in the related art wire harness, both the outer corrugated tube and the inner corrugated tube have the slits, resulting in a problem that water or foreign matters tend to easily enter interiors thereof. When water or foreign matters tend to easily enter the interiors of those corrugated tubes, it is difficult to lay the tubes on the outer side of a vehicle, for example.

Incidentally, corrugated tubes for protecting electric wires have the following problem. Namely, when a wire harness is laid in a position on a vehicle where vibrations are easily transmitted thereto from the vehicle, there is caused a problem that depending on conditions under which electric wires are accommodated in a corrugated tube, the wear of the corrugated tube is induced. Hereinafter, this wearing problem will be described specifically by reference to FIG. 6.

Figure 6:
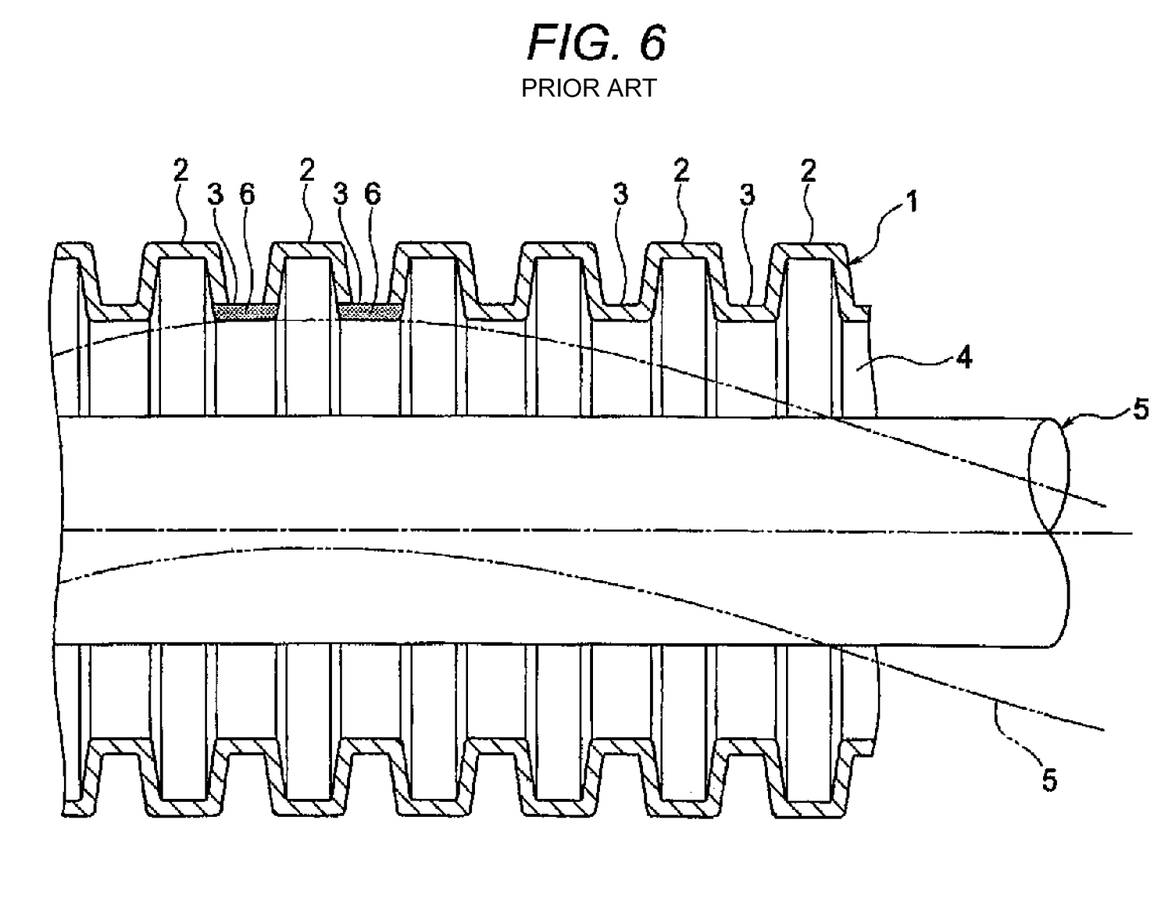
FIG. 6 is a sectional view depicting a problem of a conventional corrugated tube.

In FIG. 6, a corrugated tube 1 has ridge portions 2 and groove portions 3 which continue alternately. The corrugated tube 1 is formed so that an interior space thereof becomes an accommodation space of an electric wire 5. An inside diameter of the corrugated tube 1 is determined by the groove portions 3. An outside diameter of the electric wire 5 is smaller than the inside diameter of the corrugated tube 1. When a space between the groove portions 3 and the electric wire 5 becomes large, the electric wire 5 is struck against the groove portions 3 largely and repeatedly by vibrations transmitted to the corrugated tube 1 from the vehicle. Namely, there are caused strong or violent contacts (refer to imaginary lines in the figure), and it is confirmed from experiments that wear 6 is caused on the groove portions 3. In addition, it is also confirmed that the covering of the electric wire 5 is slightly worn out.

Depending on the extent of the wear 6, there is cased a problem that water or foreign matters enter an interior of the corrugated tube 1 from an exterior portion in case the wear 6 is so serious as to open a hole in the corrugated tube 1. In case it is concerned that the corrugated tube 1 has a defect of entrance of water or foreign matters, this will lead to a problem that the protection of the electric wire 5 is insufficient.

SUMMARY OF THE INVENTION

The invention has been made in view of the situations described above, and an object thereof is to provide a wire harness which can realize an increase in workability in fabricating a corrugated tube having a two-layered construction and which can realize an extension of its service life by reducing the wear of the corrugated tube even though vibrations are transmitted thereto.

With a view to attaining the object, according to a first aspect of the invention, there is provided a wire harness comprising an electric wire and a double-layered corrugated tube, wherein in the double-layered corrugated tube, an outer corrugated tube is formed without a slit, and an inner corrugated tube is allowed to be inserted from one end to the other end of the outer corrugated tube with the electric wire accommodated in the inner corrugated tube.

According to the invention which is characterized as described above, in forming the corrugated tube having the double-layered construction, the inner corrugated tube may only have to be inserted from the one end to the other end of the outer corrugated tube. The insertion of the inner corrugated tube with respect to the outer corrugated tube becomes smooth due to resin materials sliding one on the other. According to the invention, the outer corrugated tube is formed without a slit, and the positioning of the outer corrugated tube with respect to the inner corrugated tube becomes easy. In addition, the work of concealing or closing the slit becomes unnecessary. Further, the occurrence of a defect of entrance of water or foreign matters can be prevented.

According to a second aspect of the invention, there is provided a wire harness as set forth in the first aspect, wherein the inner corrugated tube is formed so that inner surfaces of groove portions thereof are allowed to be brought into a substantial contact with an outer surface of a covering of the electric wire in a circumferential direction.

According to the invention which is characterized as described above, the inner corrugated tube which substantially just fits on the electric wire is used, and therefore, even though vibrations are transmitted to the wire harness, it is suppressed that the electric wire is brought into contact with the inner corrugated tube. By this configuration, the wear of the inner corrugated tube is made difficult to occur which is attributed to vibrations. In addition, the rubbing of the electric wire itself is also made difficult to occur. According to the invention, when vibrations are transmitted to the wire harness, the electric wire is brought into contact with outer corrugated tube via the inner corrugated tube. As this occurs, the corrugated tubes are brought into contact with each other, whereby wear is reduced compared with the contact with a relatively hart covering of the electric wire. The inner corrugated tube functions as a cushion material, and therefore, the resulting wear becomes smaller than the contact with the covering of the electric wire. In addition, according to the invention, the inner corrugated tube is interposed between the electric wire and the outer corrugated tube, and therefore, a space defined between the outer corrugated tube and the electric wire becomes narrow, as a result of which a distance over which the electric wire oscillates becomes short, thereby the wear being reduced.

According to a third aspect of the invention, there is provided a wire harness as set forth in the second aspect, wherein the inner corrugated tube is formed so that a pitch between adjacent ridge portions in the inner corrugated tube becomes narrower than a pitch between adjacent groove portions in the outer corrugated tube.

According to the invention which is characterized as described above, the pitches are different, and therefore, the number of portions is reduced where apexes of the ridge portions of the inner corrugated tube are brought into contact with apexes of the groove portions of the outer corrugated tube. Because of this, the wear of the outer corrugated tube is reduced.

According to a fourth aspect of the invention, there is provided a wire harness as set forth in the third aspect, wherein ridge-side rounded portions having an arc-like shape in section are formed to the ridge portions of the inner corrugated tube and groove-side rounded portions having an arc-like shape in section are formed to the groove portions of the outer corrugated tube.

According to the invention which is characterized as described above, impact generated when the inner corrugated tube is brought into contact with the outer corrugated tube is dispersed in different directions from a direction in which the corrugated tubes are brought into contact by the shapes of the ridge-side rounded portions and the groove-side rounded portions. Because of this, the effect from the contact of the corrugated tubes is reduced. In addition, the sliding effect is exhibited by the shapes of the ridge-side rounded portions and the groove-side rounded portions, and the effect from the contact of the corrugated tubes is reduced.

According to a fifth aspect of the invention, there is provided a wire harness as set forth in any of the first to fourth aspects, wherein the wire harness is laid on a vehicle floor lower.

According to the invention which is configured as described above, the wire harness is laid on the lower side of the floor of the vehicle. The wire harness tends to vibrate easily because it is laid over a relatively long distance. However, the wear is reduced by the invention. Consequently, the wire harness is enabled to sustain sufficiently a use over a long period of time.

According the first aspect of the invention, the wire harness is advantageous in that the workability can be increased in fabricating a corrugated tube having a double-layered construction.

According to the second to fifth aspects of the invention, in addition to the advantage provided by the first aspect, the wire harness is advantageous in that even though vibrations are transmitted thereto, the wear of the corrugated tubes can be reduced so as to realize an extension of the service life of the wire harness.

BRIEF DESCRIPTION OF THE DRAWINGS

FIG. 3 shows sectional views of an outer corrugated tube, of which (a) is a sectional view taken along a direction which is at right angles to an axis, and (b) is a sectional view taken along the axis of the outer corrugated tube.

DESCRIPTION OF THE PREFERRED EMBODIMENTS

In a double-layered corrugated tube of a wire harness which is provided on an outer side of an electric wire, an outer corrugated tube is formed without a slit. An inner corrugated tube is formed so as to be inserted from one end to the other end of the outer corrugated tube with the electric wire accommodated therein. The inner corrugated tube is also formed so that a pitch between adjacent ridge portions thereof is narrower than a pitch between adjacent groove portions of the outer corrugated tube.

Figure 1:
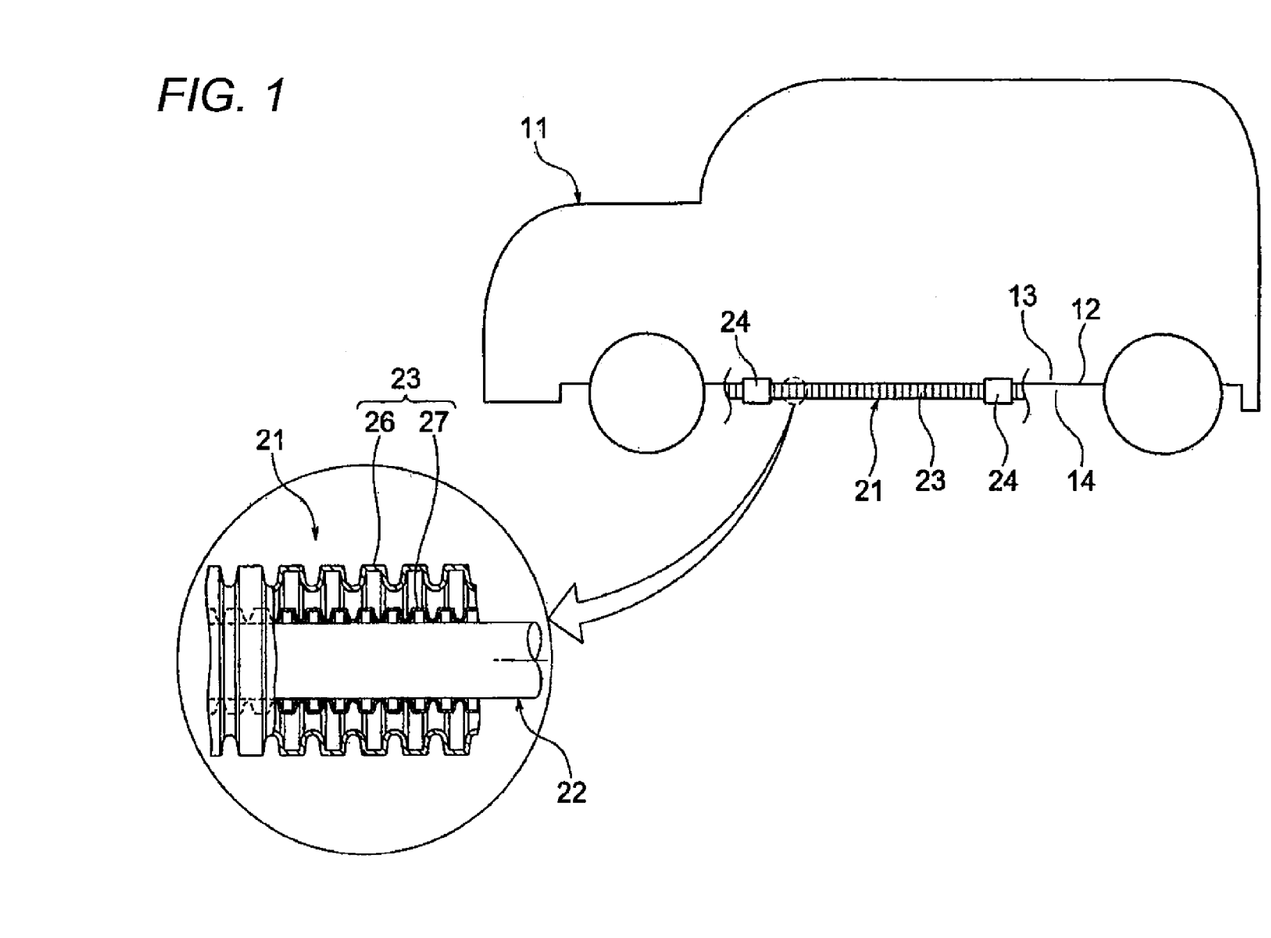
FIG. 1 is an exemplary diagram showing a vehicle on which a wire harness of the invention is laid (with the wire harness shown within a circle).
Figure 2:
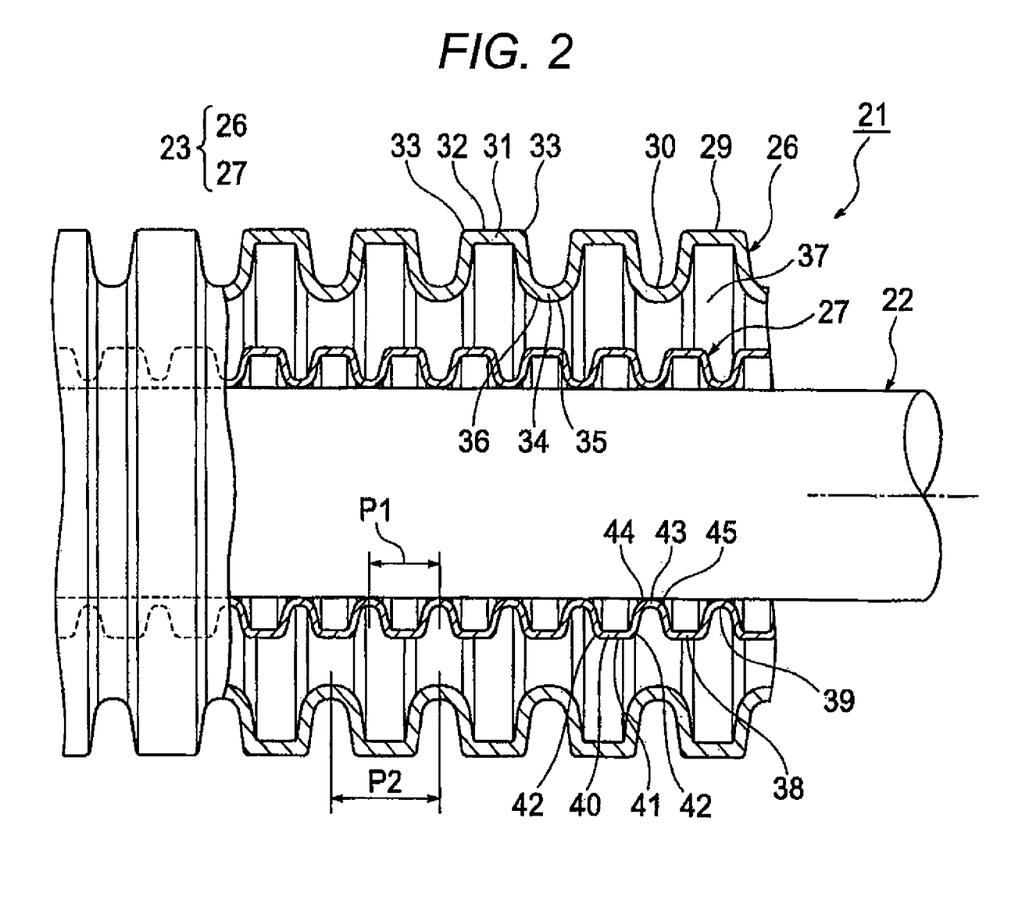
FIG. 2 is a (partially sectional) side view of the wire harness.
Figure 3A:
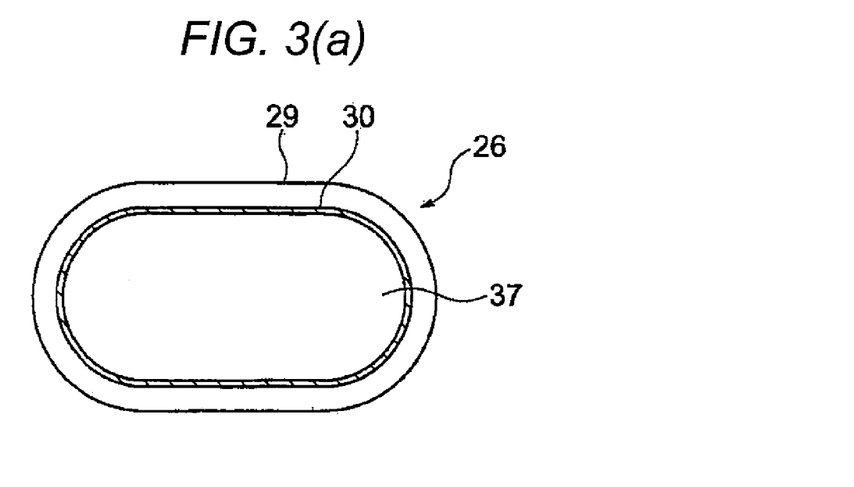
Figure 3B:
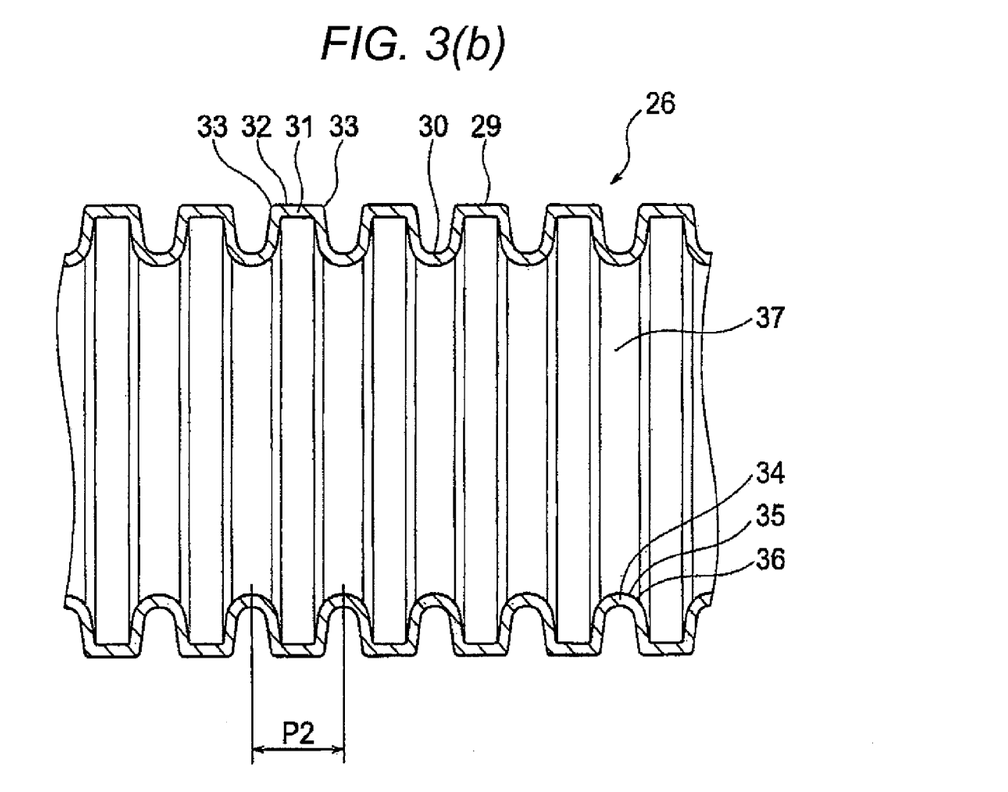
Figure 4:
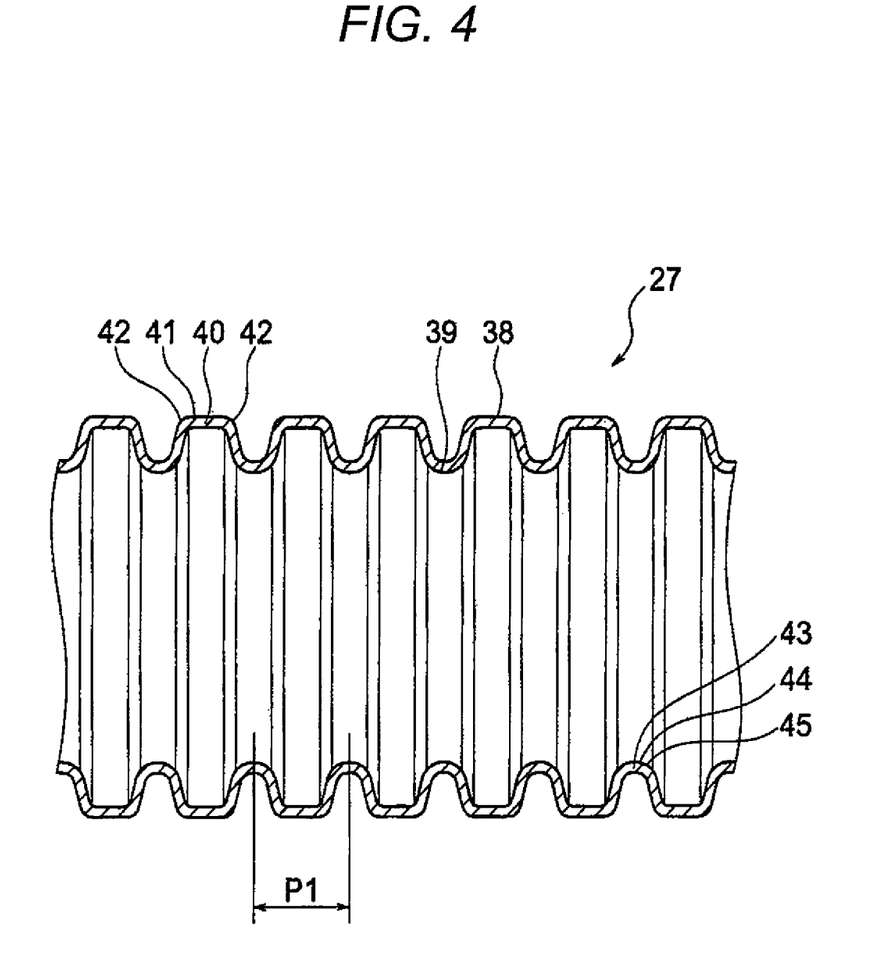
FIG. 4 is a sectional view of an inner corrugated tube taken along an axis thereof.
Figure 5:
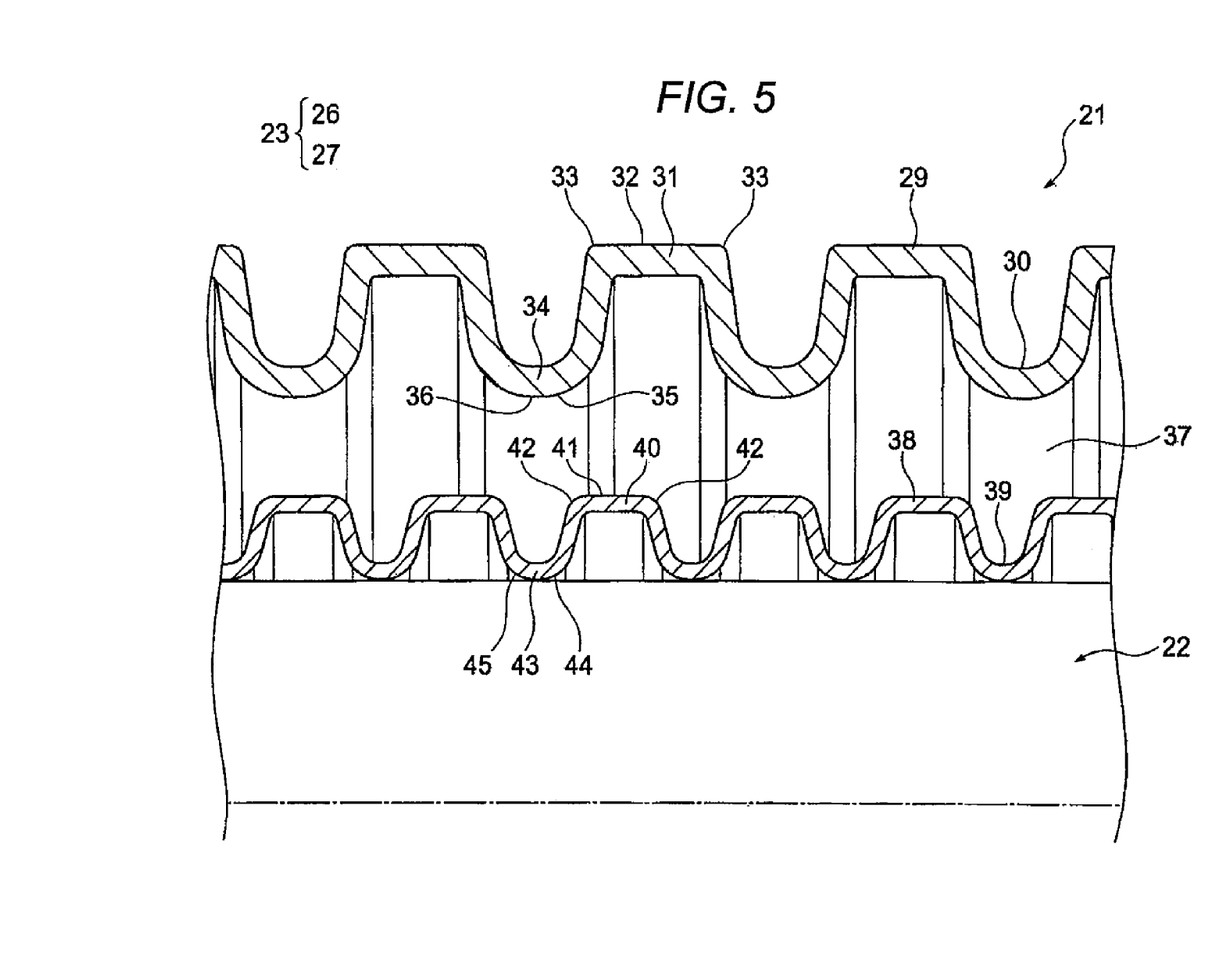
FIG. 5 is an explanatory diagram depicting a case where vibrations are transmitted to the wire harness.

Hereinafter, an embodiment will be described by reference to the accompanying drawings. FIG. 1 is an exemplary diagram showing a vehicle on which a wire harness of the invention is laid (with the wire harness shown in a circle). FIG. 2 is a (partially sectional) side view of the wire harness, FIG. 3 is a sectional view of an outer corrugated tube, FIG. 4 is a sectional view of an inner corrugated tube, and FIG. 5 is an explanatory diagram of a state in which vibrations are transmitted to the wire harness.

Although not particularly limited thereto, the wire harness of this embodiment is intended to be laid on a hybrid vehicle or an electric vehicle. Hereinafter, the embodiment will be described as being applied to a hybrid vehicle (the configuration, construction and advantage of the wire harness of the invention basically remain the same even when the wire harness is applied to an electric vehicle).

In FIG. 1, reference numeral 11 denotes a hybrid vehicle. This hybrid vehicle 11 is a vehicle which is driven by a combination of two drive sources such as an engine and a motor, and electric power is supplied to the motor from a battery via an inverter. Reference numeral 12 denotes a vehicle frame. In the figure, an upper side of the vehicle frame 12 denotes a vehicle floor upper 13. In addition, a lower side of the vehicle frame 12 denotes a vehicle floor lower 14. A wire harness 21 of the invention is laid on the vehicle floor lower 14. Note that the position where the wire harness 21 is described as being laid is an example of a layout thereof. For example, the wire harness 21 may be laid on the vehicle floor upper 13. The wire harness 21 is laid in a position where vibrations are transmitted thereto.

In FIGS. 1 and 2, the wire harness 21 of the invention includes a thick high voltage cable 22 (an electric wire), a corrugated tube 23 having a double-layered construction (a double-layered corrugated tube) which is provided on an outer side of the high voltage cable 22 and fixing members 24 which fix the double-layered construction corrugated tube 23 to the vehicle floor lower 14. The double-layered construction corrugate tube 23 is a protection member for the high voltage cable 22 and includes an outer corrugated tube 26 which is positioned outside and an inner corrugated tube 27 which is positioned inside.

Firstly, the constituent members of the wire harness 21 will be described in detail.

The high voltage cable 22 is a conductor line including a conductor and an insulator (covering) and is formed so as to have a length necessary to establish an electrical connection. One or a plurality of high voltage cables 22 are provided. The conductor in this embodiment is made of copper, copper alloy or aluminum. As to the conductor, either a conductor structure made up of twisted conductor wires or a rod-like conductor structure having a rectangular or circular cross section (for example, a conductor structure made up of a single angular or round core) may be adopted. The high voltage cable 22 has a shielded wire or non-shielded wire configuration, and in the case of the high voltage cable 22 having the latter configuration, a braided shield member or a metal foil shield member is provided on an outer side of a covering thereof. Although the high voltage cable 22 is used as the electric wire, a bundle of low-tension electric wires may be used.

In FIGS. 2 and 3, the outer corrugated tube 26 is a corrugated tube formed of a synthetic resin having insulation properties and is formed so as to have at least a length which is long enough to be laid on the underside of the floor. In this embodiment, a flat corrugated tube is used as the outer corrugated tube 26 (a round corrugated tube may also be used). The outer corrugated tube 26 is formed into a corrugated shape in which independent circumferentially extending ridge portions 29 and groove portions 30 are provided alternately and continuously along an axial direction of the tube. The outer corrugated tube 26 is formed without a slit which is cut to extend in a straight line from an opening portion at one end to an opening portion at the other end thereof. Thus, the outer corrugated tube 26 has a slit-less configuration.

In FIG. 3, the ridge portion 29 is formed as an annular portion which is convex radially outwards. In addition, the ridge portion 29 has a flat outer surface 32 at an apex portion 31 and ridge-side rounded portions 33 which connect to the outer surface 32 and has an inverted mortar-like cross section which is flared downwards. On the other hand, the groove portion 30 is formed as an annular portion which is convex radially inwards (the groove portion 30 is formed as a portion which is concave when looking at the outer corrugated tube 26 from the outside,). In addition, the groove portion 30 is formed so that an inner surface 35 of an apex portion 34 constitutes a groove-side rounded portion 36 having a substantially arc-like shape in section (the groove portion 30 has a groove shape in section which gets narrower towards a bottom thereof).

The outer corrugated tube 26 is formed so that an interior space 37 has an oval shape in cross section due to the outer corrugated tube 26 being the flat tube as has been described above. Because of this, a plurality of high voltage cables 22 can be accommodated altogether side by side in the outer corrugated tube 26. In this embodiment, since the plurality of high voltage cables 22 can be accommodated altogether side by side in the tube, the high voltage cables 22 can advantageously be laid so as to be spaced away from the ground (the high voltage cables 22 can advantageously arranged flat).

In FIGS. 2 and 4, the inner corrugated tube 27 is formed of a synthetic resin having insulation properties and substantially just fits on the high voltage cable 22 which constitutes an object to be accommodated therein. The inner corrugated tube 27 can be inserted into the interior space 37 of the outer corrugated tube 26 with the high voltage cable 22 accommodated therein. In this embodiment, a round corrugated tube which is slightly longer than the outer corrugated tube is used as the inner corrugated tube 27. The inner corrugated tube 27 is formed into a corrugated shape in which independent circumferentially extending ridge portions 38 and groove portions 39 are provided alternately and continuously along an axial direction of the tube. Since the inner corrugated tube 27 substantially just fits on the high voltage cable 22 as has been described above, the inner corrugated tube 27 has a slit, not show, which is cut in a straight line so as to extend from an opening portion at one end to an opening portion at the other end thereof and is formed so that the high voltage cable 22 can be inserted into the inner corrugated tube 27 through the slit so as to be accommodated therein.

In FIG. 4, the ridge portion 38 is formed as an annular portion which is convex radially outwards. In addition, the ridge portion 38 has an outer surface 41 which becomes flat over a limited range on an apex portion 40 and ridge-side rounded portions 42 which connect to the outer surface 41 and has an inverted mortar-like cross section which is flared downwards. The ridge-side rounded portion 42 is formed into an arc-like shape in section. On the other hand, the groove portion 39 is formed as an annular portion which is convex radially inwards (the groove portion 39 is formed as a portion which is concave when looking at the inner corrugated tube 27 from the outside). In addition, the groove portion 39 is formed so that an inner surface 44 of an apex portion 43 becomes a groove-side rounded portion 45 which has an arc-like shape in section (the groove portion 39 has a groove shape in section which gets narrower towards a bottom thereof). The inner surface 44 at the apex portion 43 has a dimension which is set so that the inner surface 44 can be brought into a substantial contact with an outer surface of a covering of the high voltage cable 22 in a circumferential direction (in order to cause the inner corrugated tube 27 to just fit on the high voltage cable 22).

The inner corrugated tube 27 is formed so that a pitch P1 between adjacent ridge portions 38 thereof is narrower than a pitch P2 between adjacent groove portions of the outer corrugated tube 26 (refer to FIG. 2). Namely, the inner corrugated tube 27 is formed so that ridges and grooves are formed denser thereon than on the outer corrugated tube 26. The inner corrugated tub 27 and the outer corrugated tube 26 are formed so that a dimensional relationship with respect to their pitches is the pitch P1<the pitch P2, the inner corrugated tube 27 and the outer corrugated tube 26 are not in a positional relationship in which the ridge portions 38 and the groove portions 30 correspond to each other directly one to one. By making the alternate arrangement of ridges and grooves on the inner corrugated tube 27 denser, the number of ridges and grooves on the inner corrugated tube 27 that can be accommodated in the flat outer corrugated tube 26 can advantageously increased.

In FIG. 1, the fixing members 24 are members intended to fix the double-layered construction corrugated tube 23 to the vehicle floor lower 14 as has been described before and formed as known corrugated tube protectors in this embodiment. The fixing members 24 are formed so as to deal with an outer corrugated tube 26 which is divided into a plurality of portions. Namely, the fixing members 24 are formed so as to join the divided tubes together. The fixing members 24 may be formed into clamps or bands in addition to the protectors described above.

Next, the assemblage of the outer and inner tubes into the wire harness 21 and layout of the wire harness 21 will be described based on the configuration and construction thereof that have been described above.

In FIG. 2, the wire harness 21 is built up by accommodating the high voltage cable 22 into the inner corrugated tube 27 and inserting the inner corrugated tube 27 which now accommodates the high voltage cable 22 therein into the interior space of the outer corrugated tube 26.

Specifically, firstly, the slit (not shown) in the inner corrugated tube 27 is opened. Following this, the high voltage cable 22 is inserted into the inner corrugated tube 27 through the slit so opened. When the inserting work is completed, the inner corrugated tube 27 substantially just fits on the high voltage cable 22. In this condition, the high voltage cable 22 is accommodated in the inner corrugated tube 27 so as not to oscillate therein (in other words, the high voltage cable 22 is accommodated so that no rubbing is generated).

Next, the inner corrugated tube 27 which now accommodates the high voltage cable 22 therein is inserted into the outer corrugated tube 26 from one end to the other end thereof, both the ends of the outer corrugated tube 26 being not shown. When the inner corrugated tube 27 is inserted into the outer corrugated tube 26 in that way, the resin materials slide one on the other, and therefore, the insertion is performed smoothly. In addition, the shape of the groove portions 30 on the outer corrugated tube 26 and the shape of the ridge portions 38 on the inner corrugated tube 27 also facilitate the smooth insertion. When this inserting work is completed, the double-layered construction corrugated tube 23 is formed.

Finally, tapes are wound round the corrugated tubes at the one end and the other end of the outer corrugated tube 26 so as to fix the inner corrugated tube 27 and the outer corrugated tube 26 in place. Thus, the series of operations in relation to the assemblage of the inner and outer corrugated tubes can be completed.

In the formation of the double-layered construction corrugated tube 23, the outer corrugated tube 26 has the shape without a slit, and therefore, the positioning of the outer corrugated tube 26 with respect to the inner corrugated tube 27 becomes easy. In addition, due to the shape without a slit, work does not have to be done which would otherwise have to be involved in concealing or closing the slit. Further, due to the shape without a slit, the occurrence of a defect of entrance of water or foreign matters is also prevented.

Although not described, metal terminals, not shown, or the fixing members 24 are installed as required.

The wire harness 21 built up in the way described above is then transferred to an assembly plant of a motor vehicles manufacturer, for example, where the wire harness 21 is laid on the vehicle floor lower 14. Specifically, the wire harness 21 is laid down along the vehicle floor lower 14 and is then fixed to the vehicle floor lower 14 via the fixing members 24 for a predetermined electric connection, and the series of laying operations of the wire harness 21 can be completed.

Following this, a case will be described by reference to FIG. 5 where vibrations generated in the running vehicle are transmitted to the wire harness 21.

In FIG. 5, when vibrations are transmitted to the wire harness 21 laid on the vehicle, the inner corrugated tube 27 is brought into contact with the groove portions 30 of the outer corrugated tube 26 in place of the high voltage cable 22. As this occurs, both the corrugated tubes are brought into contact with each other, and therefore, compared with a case where a relatively hard covering of the high voltage cable 22 is brought into contact with the outer corrugated tube 26, the wear of the groove portions 30 is reduced (since the inner corrugated tube 27 functions as a cushion material, compared with the contact of the covering of the high voltage cable 22, the wear of the grooves 30 is reduced). In addition, since the inner corrugated tube 27 is interposed between the high voltage cable 22 and the groove portions 30 of the outer corrugated tube 26, a space defined from the high voltage cable 22 to the outer corrugated tube 26 is narrow, as a result of which the distance of oscillation is shortened, whereby the wear of the groove portions 30 is reduced accordingly.

Further, the pitch P1 between the adjacent ridge portions 38 of the inner corrugated tube 27 is narrower than the pitch P2 between the adjacent ridge portions 30 of the outer corrugated tube 26, that is, the pitches P1, P2 are different. Therefore, the number of portions where the apexes of the ridge portions 38 of the inner corrugated tube 27 are brought into contact with the apexes of the groove portions 30 of the outer corrugated tube 26 is reduced. Because of this, the wear of the groove portions 30 of the outer corrugated tube 26 is reduced.

Furthermore, due to the shape of the ridge-side rounded portions 42 of the ridge portions 38 of the inner corrugated tube 27 and the shape of the groove-side rounded portions 36 of the groove portions 30 of the outer corrugated tube 26, impact generated when the ridge-side rounded portions 42 are brought into contact with the groove-side rounded portions 36 is dispersed in directions which are different from the direction in which both the rounded portions are brought into contact with each other. Because of this, the effect produced by the contact is reduced, and the wear of the groove portions 30 of the outer corrugated tube 26 is reduced. In addition, due to the shapes of the ridge-side rounded portions and the groove-side rounded portions, that is, due to the rounded shapes, the sliding effect is exhibited, whereby the effect of the contact is reduced, and the wear of the rounded portions 30 of the outer corrugated tube 26 is reduced.

Thus, the embodiment of the invention has been described by reference to FIGS. 1 to 5. As is described therein, according to the invention, compared with the conventional example, the workability can advantageously be increased in fabricating the two-layered construction corrugated tube. In addition, according to the invention, the wear of the corrugated tube can be reduced even when vibrations are transmitted to the wire harness, as a result of which the service life of the wire harness can be extended compared with the conventional example.

The invention can, of course, be modified variously without departing from the spirit and scope of the invention.

What is claimed is:

1. A wire harness, comprising:
   an electric wire; and
   a double-layered corrugated tube having an outer corrugated tube and an inner corrugated tube each having circumferential extending ridge portions and groove portions provided alternately along an axial direction the tube;
   wherein, in the double-layered corrugated tube, the outer corrugated tube is formed without a slit, and the inner corrugated tube is configured to slide inside the outer corrugated tube from one end to the other end of the outer corrugated tube with the electric wire accommodated in the inner corrugated tube,
   wherein the ridge portions convex radially outward and includes a flat outer surface and the groove portions convex radially inward.

2. The wire harness as set forth in claim 1, wherein the inner corrugated tube is formed so that inner surfaces of the groove portions thereof are allowed to be brought into a substantial contact with an outer surface of a covering of the electric wire in a circumferential direction.

3. The wire harness as set forth in claim 2, wherein the inner corrugated tube is formed so that a pitch between adjacent ridge portions in the inner corrugated tube becomes narrower than a pitch between adjacent groove portions in the outer corrugated tube.

4. The wire harness as set forth in claim 3, wherein ridge-side rounded portions having an arc-like shape in section are formed to the ridge portions of the inner corrugated tube and groove-side rounded portions having an arc-like shape in section are formed to the groove portions of the outer corrugated tube, wherein the ridge-side rounded portions are brought into contact with the groove-side rounded portions.

5. The wire harness as set forth in claim 1, wherein the wire harness is laid on a vehicle floor lower.

* * * * *